(12) United States Patent
Lewis et al.

(10) Patent No.: US 9,988,084 B2
(45) Date of Patent: Jun. 5, 2018

(54) CONTROLS FOR VEHICLES

(71) Applicant: Barreto Manufacturing, Inc., Salem, OR (US)

(72) Inventors: Mark Lewis, Union, OR (US); Joshua Chiriboga, La Grande, OR (US)

(73) Assignee: Barreto Manufacturing, Inc., La Grande, OR (US)

( * ) Notice: Subject to any disclaimer, the term of this patent is extended or adjusted under 35 U.S.C. 154(b) by 67 days.

(21) Appl. No.: 15/047,924

(22) Filed: Feb. 19, 2016

(65) Prior Publication Data

US 2016/0244095 A1    Aug. 25, 2016

Related U.S. Application Data

(60) Provisional application No. 62/119,050, filed on Feb. 20, 2015.

(51) Int. Cl.
  *B62D 11/04* (2006.01)
  *B62D 11/00* (2006.01)
(52) U.S. Cl.
  CPC .................. *B62D 11/001* (2013.01)
(58) Field of Classification Search
  CPC ...... B62D 11/001; B62D 11/006; B62D 1/12; B62D 1/181; E02F 9/2004; F16H 2059/0286
  USPC ................. 180/6.32, 334; 16/110.1
  See application file for complete search history.

(56) References Cited

U.S. PATENT DOCUMENTS

| | | | |
|---|---|---|---|
| 4,054,083 | A | 10/1977 | Utter |
| 4,090,411 | A | 5/1978 | Albright et al. |
| 4,227,428 | A | 10/1980 | Zifferer et al. |
| 5,228,360 | A | 7/1993 | Johnson |
| 5,727,426 | A | 3/1998 | Lykken et al. |
| 6,161,637 | A | 12/2000 | Decker et al. |
| 6,942,047 | B2 | 9/2005 | Woytassek |
| 7,458,432 | B2 | 12/2008 | Mayer et al. |
| 7,540,131 | B2 | 6/2009 | Stover et al. |
| 7,721,828 | B2 | 5/2010 | Fornes et al. |
| 8,087,481 | B2 | 1/2012 | Trefz et al. |
| 8,794,660 | B1 | 8/2014 | Stover et al. |
| 2003/0234131 | A1 | 12/2003 | Woytassek |
| 2006/0053763 | A1 | 3/2006 | Stover et al. |
| 2009/0056492 | A1 | 3/2009 | Trefz et al. |

*Primary Examiner* — Tony H Winner
(74) *Attorney, Agent, or Firm* — Klarquist Sparkman, LLP (57) ABSTRACT

Disclosed devices, systems, and methods allow an operator to maintain the speed of a vehicle's propulsion devices at selected speeds, and allow the operator to make adjustments to the selected speeds during or prior to operation of the vehicle. Disclosed embodiments can comprise adjustable limiters that are coupled to the control portion of the vehicle adjacent to or on the speed control levers. This allows the operator to hold the levers against a new limiting surface to keep the vehicle moving at a speed that is less than full speed with minimal aberration and less effort needed by the operator. The device can be adjustable to a range of positions corresponding to different speeds. The devices can also be selectively pivoted or moved out of the way of the speed control levers at any time to allow the levers to have their full range of motion.

20 Claims, 9 Drawing Sheets

CONTROLS FOR VEHICLES

CROSS-REFERENCE TO RELATED APPLICATION

This application claims the benefit of U.S. Provisional Application No. 62/119,050, filed on Feb. 20, 2015, which is incorporated by reference herein in its entirety.

FIELD

This application is related to devices, systems and methods for controlling the motion of vehicles, such as land vehicles having independently controlled left and right drive mechanisms.

BACKGROUND

Many vehicles are designed with a pair of levers to control vehicle speed and direction. Typically, one lever controls the speed of a left propulsion device, and another lever controls the speed of a right propulsion device. For example, the propulsion devices can be tracks or wheels. The two levers are often positioned close to each other so an operator can move them in unison with one hand and hold them stationary in a position corresponding to a desired speed and direction for the vehicle. Adjusting one lever differently than the other typically causes one side to move faster than the other, which leads to the vehicle turning, whether intentionally or not.

It is often necessary to drive such vehicles along a straight path, such as when digging a trench. Driving a straight path requires consistent input from the operator, who must monitor the direction of the vehicle and continuously make adjustments to the levers to keep the vehicle on course with minimal aberration from the desired straight path. Many factors out of the control of the operator can cause the vehicle to turn slightly, such as variations in terrain, changes in soil types, etc. This process tends to be fatiguing for the operator over long periods of time. The process can be especially fatiguing when the desired vehicle speed is less than the maximum speed of the vehicle, such that the operator has to keep both levers steady in an intermediate position along the available range of travel for the levers. It can be simpler to maintain a straight path at full speed, since an operator can push/pull both of the levers to the maximum limit of their travel and then hold them in that position with constant force applied against a stationary limiting surface. However, during working operations it is often impractical to operate a vehicle at full speed.

SUMMARY

Disclosed herein are devices, systems, and methods that allow an operator to maintain the speed of a vehicle's propulsion devices at selected speeds that are less than full speed, and allow the operator to make adjustments to the selected speeds during or prior to operation of the vehicle. Disclosed embodiments can comprise adjustable stops or limiters that are coupled to the control portion of the vehicle adjacent to or on the speed control levers. These devices can be set to a selected position to provide a stop that limits the levers to a modified-maximum position that is different from the normal maximum, full-speed position. This allows the operator to hold the levers against a new limiting surface to keep the vehicle moving at a speed that is less than full speed with minimal aberration and less effort needed by the operator. The device can be adjustable to a range of positions corresponding to different speeds, and each lever can have its own limiting device to set an independent modified-maximum speed for each propulsion device of the vehicle. This can be used to drive in a straight line or along a controlled curve with more precision and less effort. The devices can also be selectively pivoted or moved out of the way of the speed control levers at any time to allow the levers to have their full range of motion.

The foregoing and other objects, features, and advantages of the disclosed technology will become more apparent from the following detailed description, which proceeds with reference to the accompanying figures.

DETAILED DESCRIPTION

Described herein are embodiments of control mechanisms for vehicles where the velocity of one side of the vehicle is controlled separately from the velocity of the other side of the vehicle. For example, in certain wheeled vehicles, the left side wheels are controlled by one lever and the right side wheels are controlled by another lever. Similarly, many tracked vehicles have independently controlled left and right tracks. The disclosed technology can be applicable to any vehicle having two or more independently controlled drive mechanisms or propulsion devices (e.g., wheels, tracks, propellers, jets, etc.), including walk-behind vehicles and riding vehicles, with some examples including trenchers, skid-steers, bulldozers, excavators, lawn mowers, snowmobiles, motor boats, jet skis, tanks, aircraft, and the like. Though the disclosed technology can be applied in an analogous manner to a broad range of vehicle types, the following description proceeds with reference to exemplary land vehicles, and tracked land vehicles in particular, as non-limiting examples in order to conveniently illustrate the details of the disclosed technology.

Figure 1:
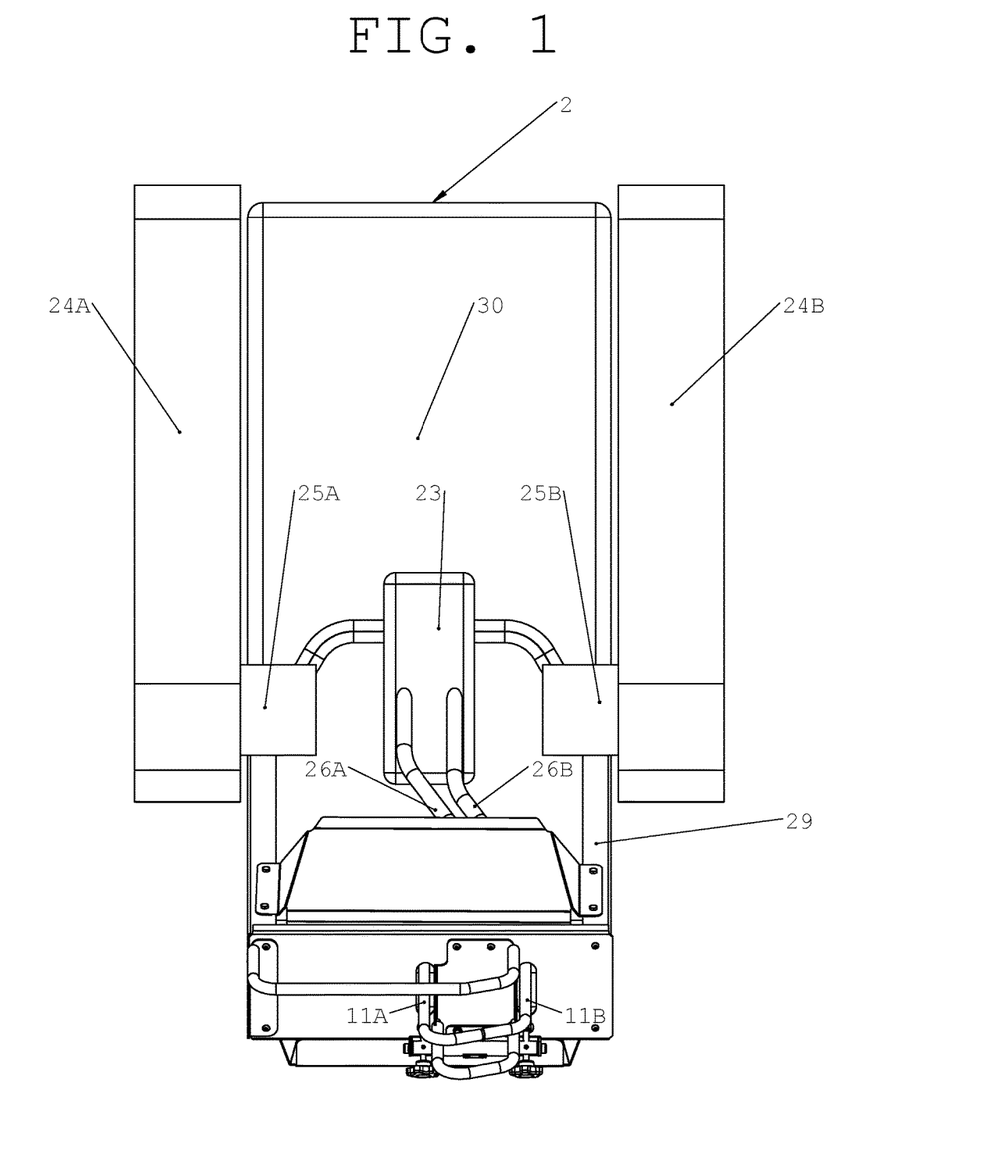
FIG. 1 is a top view of an exemplary tracked vehicle.
Figure 2:
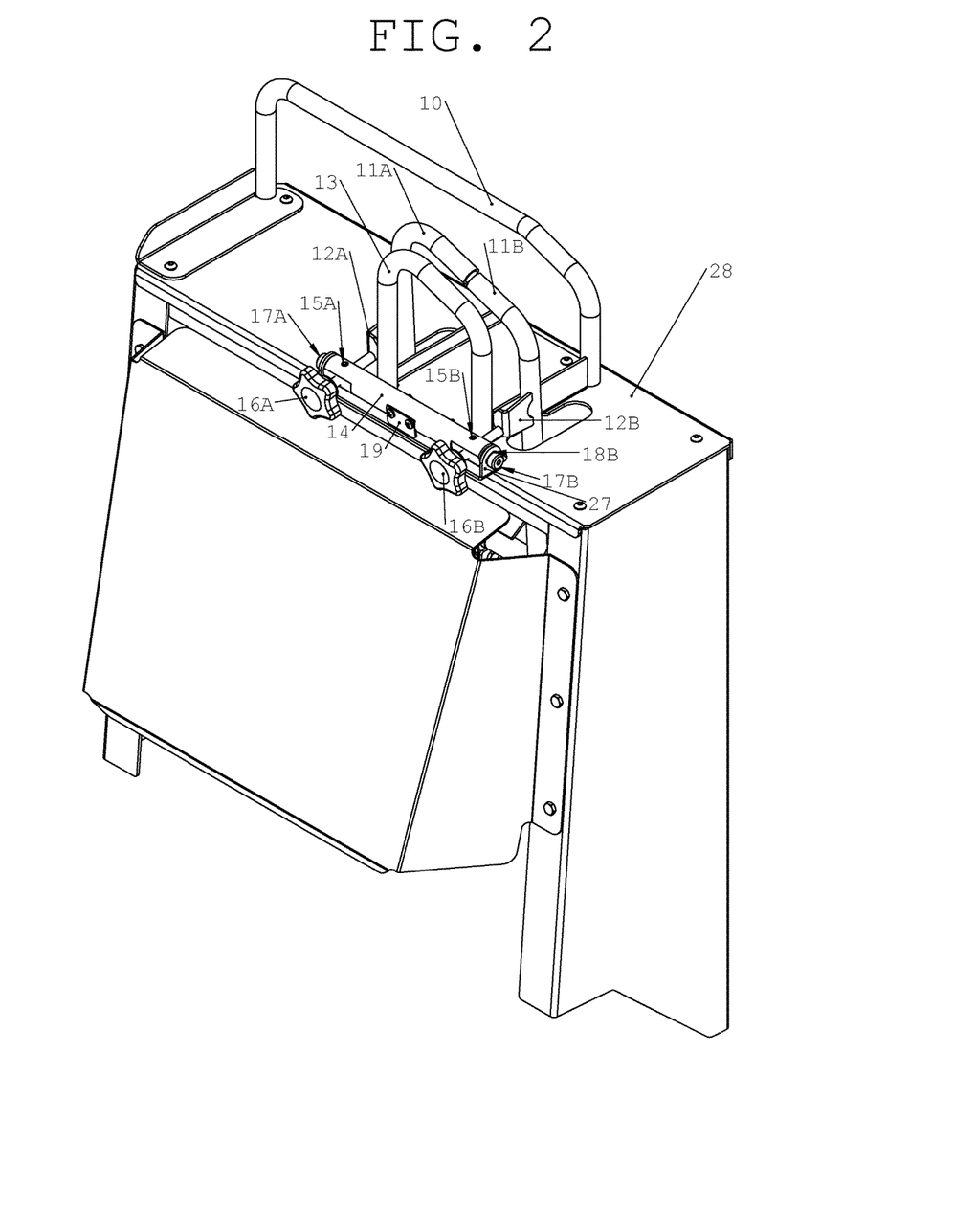
FIG. 2 is a rear perspective view of an exemplary control portion of the tracked vehicle.
Figure 3:
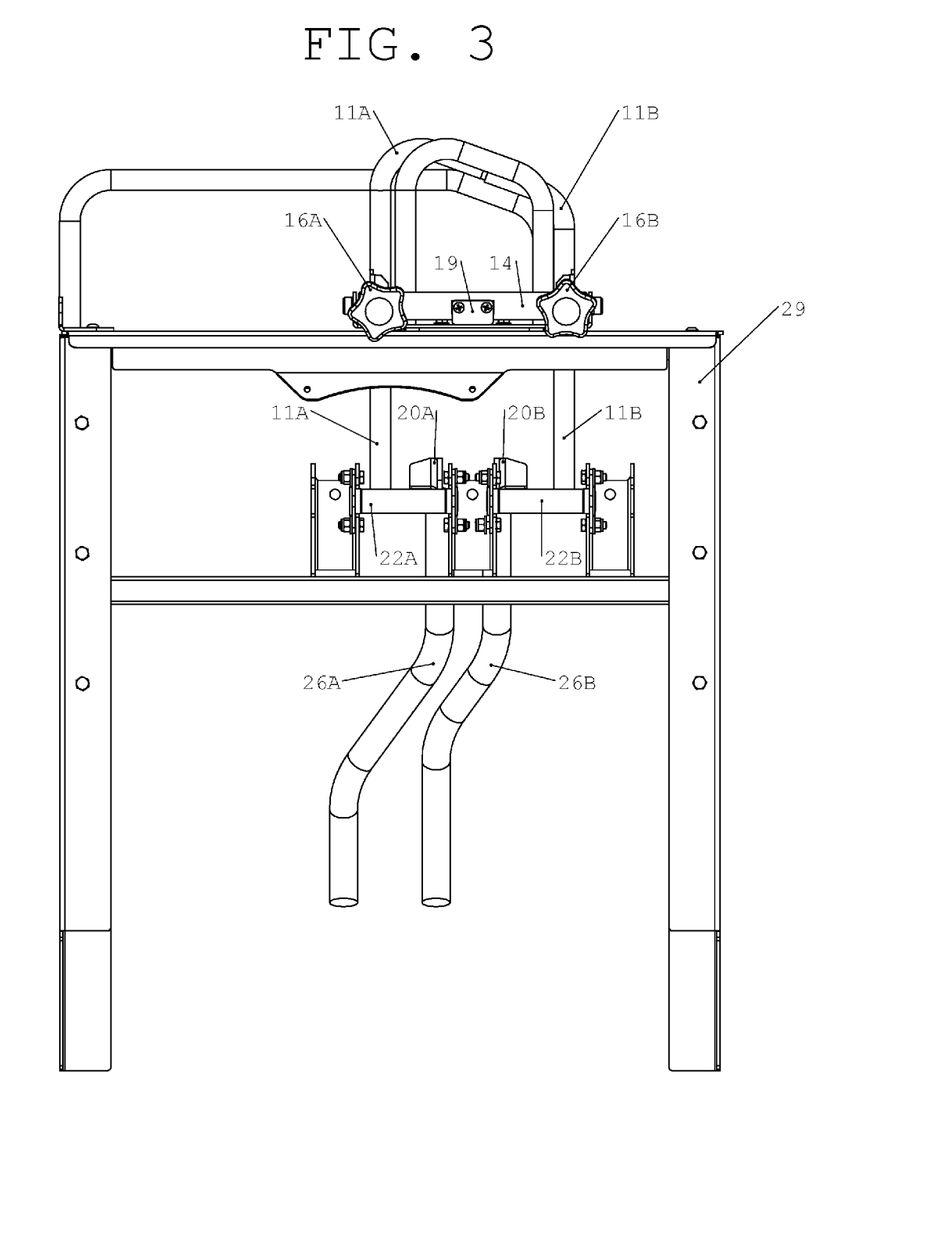
FIG. 3 is a rear elevation view of the control portion of FIG. 2, with a rear cover panel removed.
Figure 4:
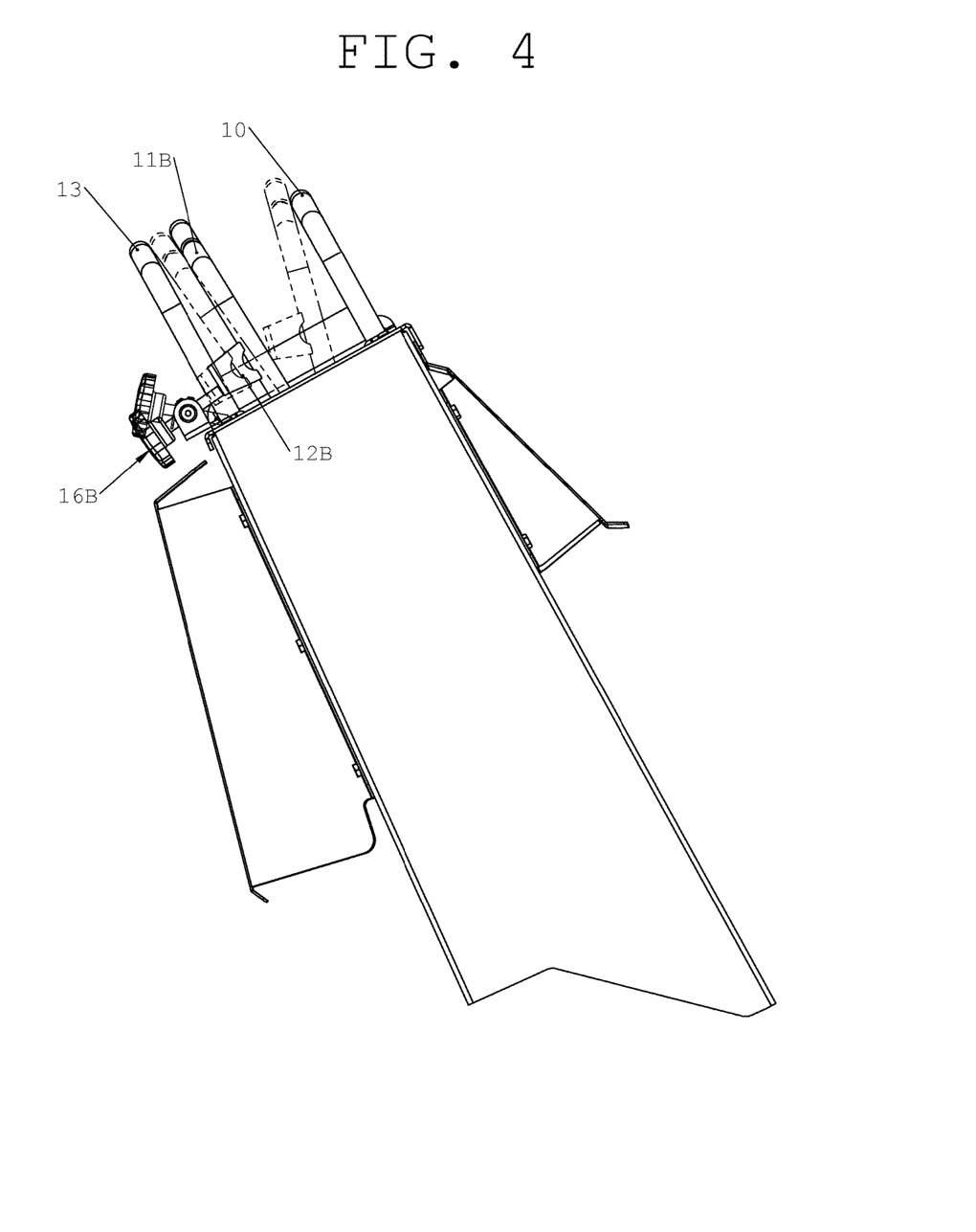
FIG. 4 is a side elevation view of the control portion of FIG. 2, showing multiple positions for certain adjustable speed control components.

An exemplary tracked vehicle 2 is shown in a top view in FIG. 1. An upper rear control portion of the vehicle is shown in FIGS. 2-5. The speed and direction of the vehicle 2 can be controlled by two operator actuated levers 11A and 11B, such that the speed and direction of the left track 24A directly corresponds to the position of left lever 11A and the speed and direction of the right track 24B directly corresponds to the position of the right lever 11B. FIG. 4 shows a full range of motion of front-to-rear positioning of the levers (only lever 11B is shown in the side view of FIG. 4). When there is a difference between left and right lever positions, one track can move slower than the other, and the vehicle turns in the direction of the slower track. The full range of motion can include a neutral position (e.g., where the track is stopped), a full maximum forward position at one end (corresponding to the maximum speed of the track in one direction), and a full maximum rearward position at the opposite end (corresponding to the maximum speed of the track on the opposite direction).

To operate the vehicle 2, the operator can optionally place the heel of their hand on a stationary hand rest 13 (see FIG. 2) and engage the control levers 11A, 11B with their fingers or finger tips. A hand hold bar 10 can also be provided at the forward end of the control panel (FIG. 2), which can provide more stability and control of the vehicle, and can also be used with the control levers 11A, 11B by placing the palm of the hand on the levers and the fingers on the hand hold bar 10. From a neutral position, moving the levers 11A, 11B rearward toward the hand rest 13 can increase the speed of the tracks 24A, 24B in a rearward direction, while moving the levers forward toward the hand hold bar 10 can increase the speed of the tracks in the forward direction. During slow-speed trenching operations, for example, the vehicle 2 can be driven slowly in the rearward direction while a trench is dug at the front of the vehicle. Thus, it can be desirable to maintain a constant rearward speed at less than the full maximum rearward speed during certain operations like digging a trench. Note that the end of the vehicle with the trencher can alternatively be referred to as the "rear" of the vehicle, in which case the vehicle is driven in the "forward" direction during a typical trenching operation.

The levers 11A, 11B, the hand rest 13, and/or the hand hold bar 10 can have an angled grip portion to provide a more ergonomic configuration for placement of the operator's hand. For example, as shown in FIGS. 2 and 3, the levers 11A, 11B, the hand rest 13, and the hand hold bar 10 can all have an angled upper grip portion that slopes down from left to right. The slope of the upper grip portions can all be about the same, or can vary between the different elements. The slope can be any angle between horizontal and vertical, such as about 10 degrees from horizontal to about 50 degrees from horizontal. The angled grip portions allow the operator's hand (e.g., his right hand) to comfortably grip and control one or both of the levers 11A, 11B over long periods of time while maintaining a more ergonomic wrist angle compared to horizontal or vertical levers. In alternative embodiments, the levers 11A, 11B, the hand rest 13, and/or the hand hold bar 10 can have a horizontal grip portion rather than an angled grip portion.

Prior to or during operation of the vehicle 2, the operator can move one or more limiters into an engaged position such that the limiters obstruct the full range of motion of one or both of the levers 11A, 11B and create an modified maximum position for one or both of the levers, thereby reducing the full range of motion of the levers to a reduced range of motion. For example, in the engaged position the limiters can obstruct the levers in the rearward direction to create modified maximum rearward positions for the levers, thereby creating reduced maximum speeds for the left and right drive mechanisms in the rearward direction. Further, the limiters can be additionally individually adjusted along respective adjustment axes aligned with the direction of travel of the levers to fine tune the modified maximum positions of the levers. A limiter's motion between its engaged position and its disengaged position (where the lever has its full range of motion) can be a different motion (e.g., along a different axis and/or in a different direction) compared to the motion of the limiter along the adjustment axis to fine tune the modified maximum position. Between the engaged and disengaged positions, the limiters can pivot, translate, tilt, rotate, be removed, relocated, and/or be moved in other manners. To be adjusted along the adjustment axis, the limiters can be rotated, pushed/pulled, slid, ratcheted, removed and replaced in a new position, and/or moved in other manners different from the motion between the engaged and disengaged positions.

In some embodiments, the limiters can comprise pivoting adjustment knobs, as shown in FIGS. 1-12. For example, with reference to the embodiment shown in FIGS. 1-6, the operator may pivot adjustment knobs 16A and 16B into the engaged position shown in FIG. 2, such that they limit the rearward range of motion of the control levers 11A, 11B. FIG. 4 illustrates an exemplary range of pivoting motion for the knobs 16A and 16B, as well as full and modified ranges of motion of the levers 11A, 11B. The adjustment knobs 16A, 16B can also be turnable/rotatable to allow the operator to fine tune the modified maximum position of each lever individually, thus allowing better control and modification of vehicle speed and direction. This allows the operator to maintain a straight path or a controlled curve (e.g., constant radius of curvature), even while working at speeds less than full speed, especially during slower rearward speeds used for trenching operations. When the operation is complete, or during an operation, the operator can pivot the adjustment knobs 16A, 16B from the engaged position to a disengaged position such that they do not engage or limit the levers 11A, 11B and the operator can run the vehicle at higher speeds.

The adjustable knobs 16A, 16B can limit the motion of the levers 11A, 11B to any desired position along the normal full range of motion of the levers, and allow the operator to easily maintain a straight or curved path at less-than-full speeds conducive to various working conditions. If the vehicle veers from a desired path, the operator can make corrections by rotating the knobs 16A, 16B to adjust the front-to-rear positions of the knobs via a threaded engagement with a trunnion 14 (FIG. 2), or other mounting component, while continuing the working operation. Since the limits of both levers 11A, 11B are easily and independently adjustable using the knobs 16A, 16B, it permits the operator to intentionally veer from a straight path and follow a consistent curved path. Further, the knobs 16A, 16B can pivot about a side-to-side axis defined by the trunnion 14 to a non-limiting, disengaged position (FIG. 4) at any time during operation or after operation, such that the left and right drive mechanisms can achieve speeds in excess of the modified maximum speeds set by the limiters.

As shown in FIG. 1, the vehicle 2 comprises a body 30 that is supported by left side track 24A and right side track 24B. For example, the body 30 can support an engine to power a drive pump 23 capable of separately providing fluid under pressure to a left drive motor 25A and right drive motor 25B. The body 30 also supports a rear control tower 29, which houses the operator controls, including the control levers 11A, 11B.

Figure 5:
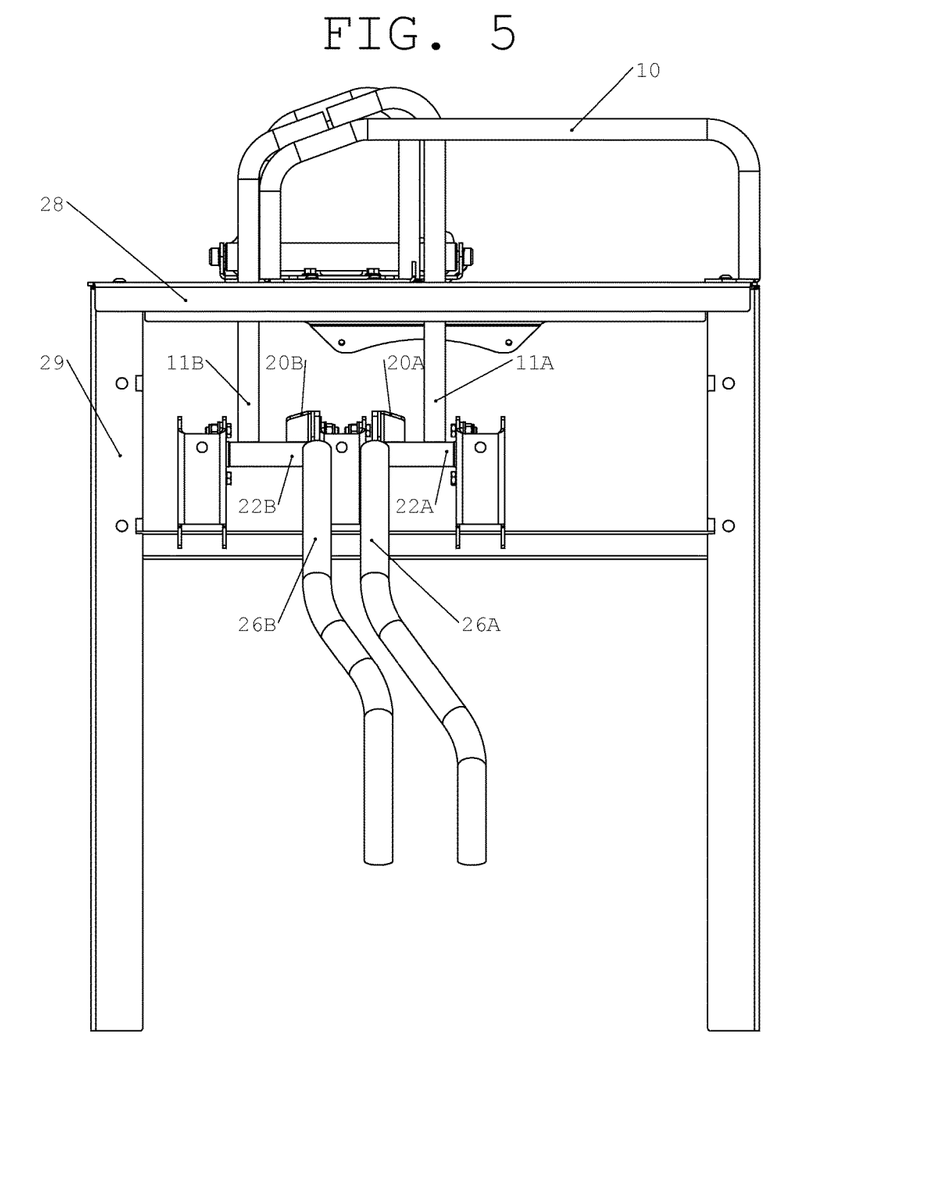
FIG. 5 is a front elevation view of the control portion of FIG. 2, with a front cover panel removed.

As shown in FIGS. 3 and 5, in the illustrated example the control levers 11A, 11B can be connected to shafts 22A and 22B, which are pivotally coupled to the control tower 29 below the operations control panel 28 (shown in FIG. 2). Lever arms 20A & 20B can be coupled to the shafts 22A and 22B and link rods 26A and 26B can be pivotally attached to the lever arms 20A and 20B and to the drive pump 23. The drive pump 23 then provides pressurized fluid to the motors 25A and 25B directly corresponding to the position of control levers 11A and 11B. Various other configurations of the linkage components below the control panel 28 can be used in alternative embodiments. When control lever 11A is moved forward or rearward from a neutral position, the drive pump 23 can provide pressurized fluid to motor 25A such that the track 24A has a velocity directly corresponding to the varying position of control lever 11A. Similarly, when control lever 11B is moved forward or rearward from a neutral position, the drive pump 23 can provide pressurized fluid to motor 25B such that the track 24B has a velocity directly corresponding to the varying position of control lever 11B.

In some embodiments, forward motion of the levers 11A, 11B from a neutral position corresponds to forward motion of the vehicle, and rearward motion of the levers from a neutral position corresponds to rearward motion of the vehicle. In other embodiments, the opposite can be true. When control levers 11A, 11B are released, they can automatically/naturally return to the neutral position (e.g., using springs), such that the pump 23 ceases providing motors 25A, 25B with pressurized fluid and the velocity of the track 24A, 25B approaches zero.

As shown in FIG. 2, the trunnion 14 can be pivotally coupled to a mounting bracket 27 which can be affixed to the control tower 29 aft of the control levers 11A, 11B. The knobs 16A and 16B can be threadedly coupled to the trunnion 14 at either end of the trunnion. As shown, the axes of the threaded screws of the knobs 16A and 16B can be substantially parallel (oriented in a generally front-rear direction) to each other and can be substantially perpendicular to the rotation axis of the trunnion 14 (oriented in a generally side-to-side direction).

Figure 6:
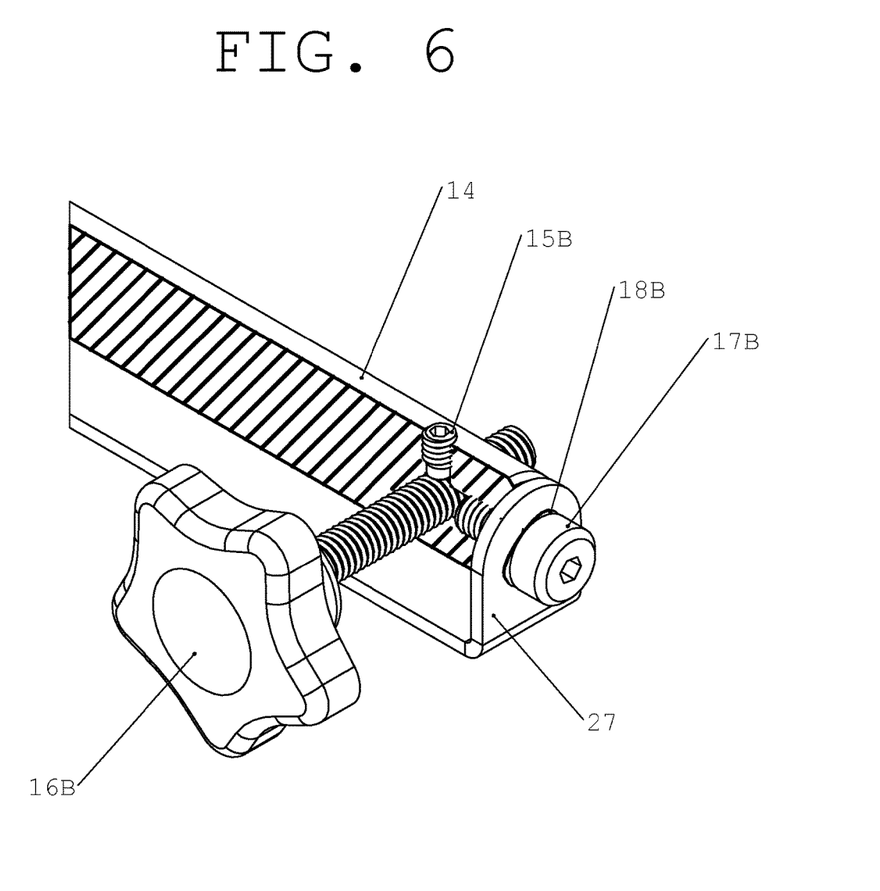
FIG. 6 is a cross-sectional perspective view of a trunnion on the control portion of FIG. 2.

FIG. 6 shows one end of the trunnion 14 with the knob 16B threadedly engaged with the trunnion. Rotating the knobs 16A and 16B causes them to move in and out (forward and rearward) of the threaded holes in the trunnion 14 along the axes of the threaded screws of the knobs. Other types of adjustable mechanical engagements between the knobs and the trunnion can alternatively be used instead of a threaded engagement.

A stop plate 19 can be fixedly coupled to the trunnion 14 to define a consistent and desirable rotational limit of the trunnion which corresponds to the engaged position of the knobs 16A and 16B. In this position, the stop plate 19 contacts the upper surface of the control tower, or another fixed surface, to stop further rotation of the trunnion 14.

To ensure against unintentional movement of the trunnion 14 and knobs 16A, 16B, such as due to vibrations and impacts, bolts 17A, 17B and washers 18A, 18B can be included at each end of the trunnion (see FIG. 6) to provide increased resistance against rotation of the trunnion about the bracket 27. Bolt 17A and washer 18A are not shown in FIG. 6, but are located on the opposite end of the trunnion from bolt 17B and washer 17A. When the bolts 17A, 17B are appropriately torqued, the bolts and the washers 18A, 18B apply sufficient frictional resistance between the mounting bracket 27 and the trunnion 14 to ensure the pivoted position of the trunnion 14 cannot unintentionally change. The washers 18A, 18B can be spring washers and/or can comprise a polymeric (e.g., nylon) contact material to provide a desired coefficient of friction and wear resistance.

As also illustrated in FIG. 6, set screws 15A and 15B can be inserted radially into threaded openings in the trunnion 14 to engage the threaded screw portions of the knobs 16A and 16B within the trunnion. With appropriate torque, the set screws 15A, 15B can apply sufficient friction against the threaded screw portions of the knobs 16A, 16B to prevent unintentional rotation of the knobs relative to the trunnion. The set screws 15A, 15B can comprise a polymeric (e.g., nylon) contact surface that engages the threaded screws to provide a desired coefficient of friction and wear resistance.

To operate the vehicle, an operator can rest the heel of their hand on hand rest 13 and engage the control levers 11A and 11B with their fingers. Use of the hand rest 13 is optional. As shown in FIG. 3, the hand rest 13 can be horizontal or angled from horizontal to provide the operator with a desired ergonomic support, and the grip portions of the control levers 11A and 11B can be configured to match the ergonomic angle of the hand rest 13. The bar 10 can also optionally have a similar angle at the end portion that is in front of the levers 11A, 11B. The two grip portions of the control levers can be adjacent to each other and aligned with each other along a common non-horizontal axis, for example. This facilitates actuating and holding both levers simultaneously with one hand in an ergonomic position.

When engaging in a working operation in which the operator desires the vehicle to follow a substantially straight path in the rearward direction, for example, the operator can pivot the adjustment control trunnion 14 into the engaged position set by the stop plate 19 (FIG. 2). As shown in FIGS. 2 and 4, the forward end of the threaded screws of the knobs 16A and 16B can then contact bumper plates 12A and 12B that are fixed to the control levers 11A, 11B when the levers are pulled toward the rearward position. This limits the maximum rearward position of the levers 11A, 11B to the point where the bumper plates 12A, 12B contact the threaded screws, thereby setting a modified-maximum speed that is less than the normal maximum speed of the machine. The user can simply maintain light rearward pressure on the levers 11A, 11B to keep the bumpers in contact with the threaded screws in order to maintain a selected speed set by the knobs 16A, 16B. In alternative embodiments, the bumper plates can be fixed to the aft ends of the threaded screws so that the levers 11A, 11B contact the bumper plates to limit their motion.

By limiting the rearward speed of the tracks 24A and 24B using the knobs 16A, 16B, should the operator notice any unintentional veering from a substantially straight path, the user can rotate one or both of the knobs 16A and 16B to fine tune the speed of the tracks to bring the vehicle back to a substantially straight path. Should the working operation allow and the operator desire a change in speed, both knobs 16A, 16B can be adjusted about the same amount, thereby changing the vehicle speed during the working operation while the vehicle continues on a substantially straight path.

In alternative embodiments, the knobs can be substituted with limiters that are adjustable along an adjustment axis by means other than rotation and mating threaded engagements. For example, the limiters can simply slide axially without rotation. The limiters can be fixed at a desired axial position by various means, such as set screws, spring-loaded locking tabs, pins, etc. Ratcheting mechanisms can also be used to control the axial motion of the limiters. Any other suitable mechanical, motorized, and/or electronic arrangement can also be used to control the axial motion of the limiters.

FIGS. 13-14 and 16-19 of U.S. Provisional Application No. 62/119,050, filed on Feb. 20, 2015, which is incorporated by reference herein, show additional details of an exemplary tracked trencher vehicle that includes independently controlled left and right treads and a user control system similar to the embodiment illustrated in FIGS. 1-6 of this application.

Figure 7:
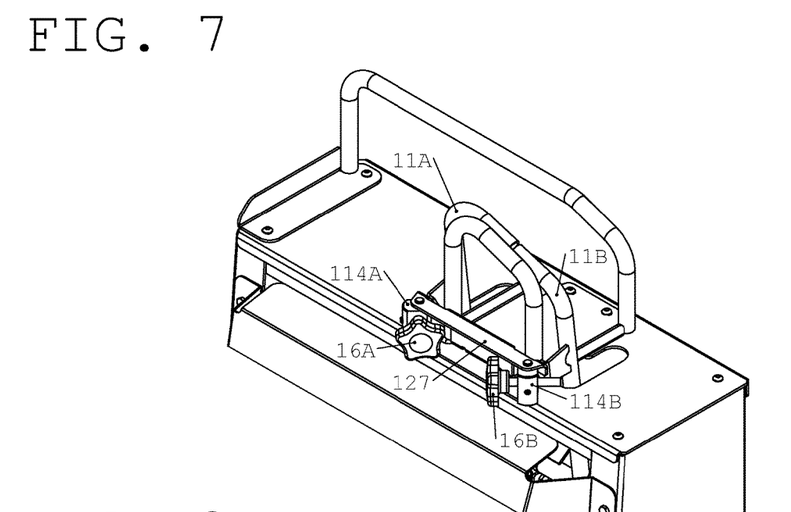
FIGS. 7 and 8 are perspective views of another exemplary control portion for a tracked vehicle, shown in two different configurations.
Figure 8:
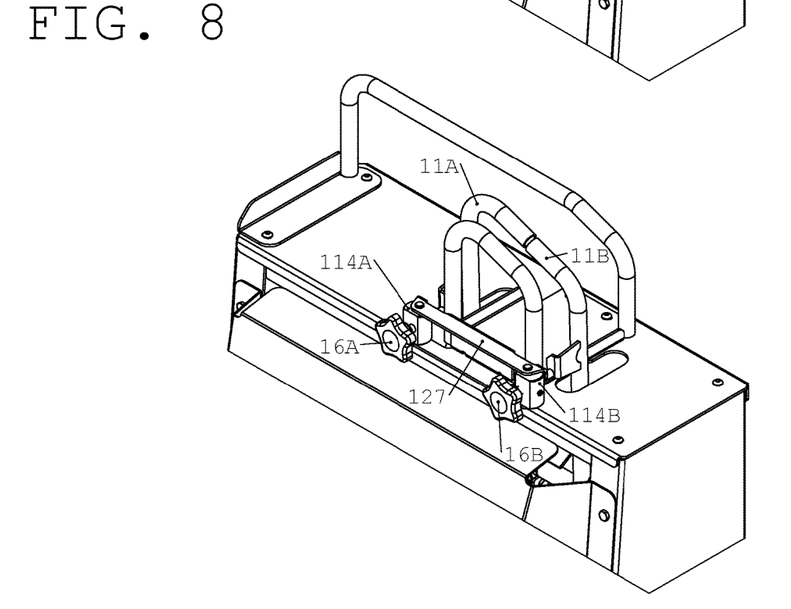

FIGS. 7 and 8 show an alternative embodiment of the previously described control technology. In this embodiment, two separate trunnions 114A and 114B are pivotally mounted to an upper horizontal mounting bracket 127, such that each end of the mounting bracket supports one of the two trunnions aft of a respective one of the two control levers 11A and 11B. The lower ends of the trunnions 114A, 114B can be coupled to one or more lower mounting plates and/or to the top of the control tower 29. The trunnions 114A and 114B pivot about at least partially vertical axes, which can be generally parallel to each other and can be generally perpendicular to directions the control levers 11A, 11B move. Knobs 16A and 16B each thread through a respective one of the two trunnions generally perpendicular to the rotation axes of the trunnions. When the knobs are rotated about the axis of the threaded screw portion of the knobs, the knobs can move in and out of the trunnions to adjust the rearward limit of the control levers.

Each trunnion 114A, 114B can then be individually pivoted such that the knobs 16A, 16B pivot laterally to at least two primary positions. In the first primary position, shown in FIG. 7, the knobs are pivoted out of alignment with the control levers 11A, 11B and prevented from interfering with the rearward movement of the levers, such that the levers can reach the full extent of the rearward position. In FIG. 7, the control levers are shown in the full rearward position.

In the second primary position, shown in FIG. 8, the screw end of the knobs 16A, 16B are aligned behind the control levers 11A, 11B, limiting the maximum rearward position of the control levers. The knobs 16A and 16B can then be utilized to control the vehicle as described in the preferred embodiment. This configuration allows each knob to be individually engaged or not engaged. Bumper plates can optionally be included on the control levers (as illustrated) or on the threaded screws.

FIGS. 15 and 20-22 of U.S. Provisional Application No. 62/119,050 show additional details of an exemplary tracked trencher that include a control system similar to the embodiment illustrated in FIGS. 7 and 8 of this application.

Figure 9:
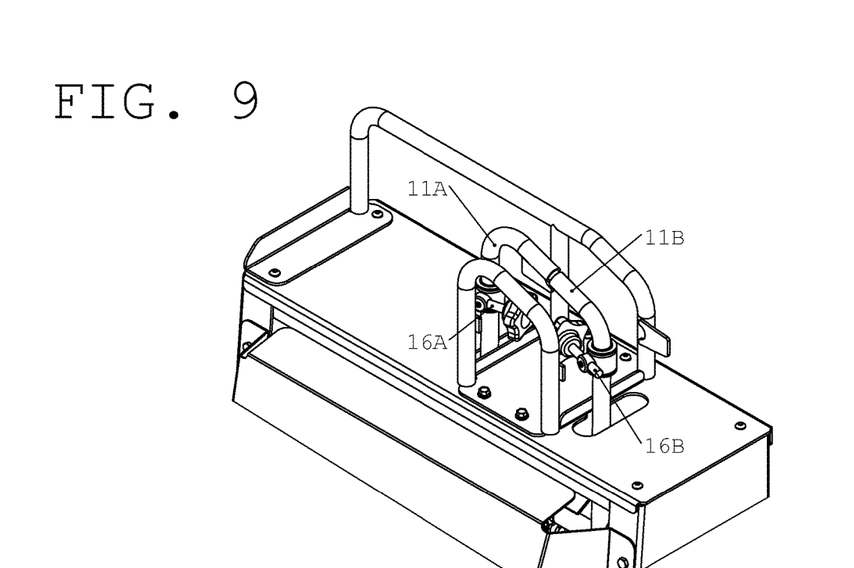
FIGS. 9 and 10 are perspective views of yet another exemplary control portion for a tracked vehicle.
Figure 10:
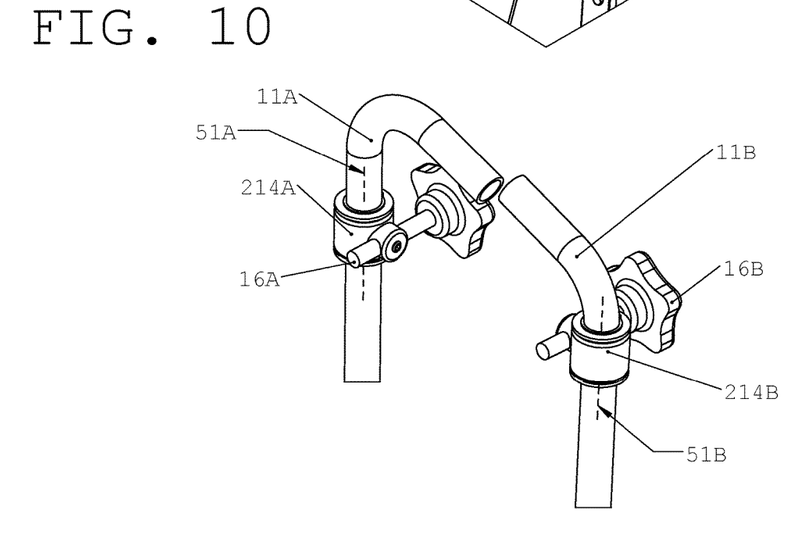

FIG. 9 and FIG. 10 show another alternative embodiment of the previously described control technology. As shown in FIG. 10, in this embodiment, the control levers 11A and 11B each have a trunnion 214A or 214B pivotally mounted to the vertical portion of the lever, such that each trunnion pivots around a respective axis 51A, 51B parallel to the control lever to which the trunnion is mounted. The trunnions 214A and 214B each include an engagement portion offset from the pivot axis 51A, 51B where one of the knobs 16A, 16B is threaded through the trunnion. When a knob is turned about the axis of its threaded portion, the knob moves in and out of the trunnion. Each knob 16A and 16B pivots about the axes 51A, 51B with the trunnion 214A or 214B to which it is engaged, so that the knobs can pivot around the control levers.

Each trunnion 214A, 214B can then be individually pivoted such that the knobs 16A, 16B pivot to at least two primary positions. In a first primary position, shown in FIG. 9, the knobs are pivoted out of alignment with the hand rest 13 and are prevented from interfering with the rearward movement of the levers 11A, 11B, such that the levers can reach the full extent of the rearward position. In this position, the knobs can also be out of alignment with the bar 10 and prevented from interfering with the forward movement of the control levers, such that the levers can reach the full extent of the forward position.

In a second primary position, shown in FIG. 10, the screw ends of the knobs 16A, 16B project rearwardly from the control levers 11A, 11B toward the hand rest 13 or bumper plates fixed to the hand rest, limiting the maximum rearward position of the control levers. The knobs 16A and 16B can then be turned to control the rearward motion of the vehicle, as described in the preferred embodiment.

In some embodiments, the knobs can be adjusted to a third primary position. In the third primary position, not shown, the screw ends of the knobs 16A, 16B project forwardly from the control levers 11A, 11B toward the bar 10 or bumper plates fixed to the hand rest, limiting the maximum forward position of the control levers. The knobs 16A and 16B can then be turned to control the forward motion of the vehicle.

The embodiment of FIGS. 9 and 10 allows each knob to be individually engaged or not engaged with either a forward limiter or a rearward limiter. Bumper plates can optionally be included on the hand rest 13 and the bar 10 (as illustrated), or on the threaded screws.

Figure 11:
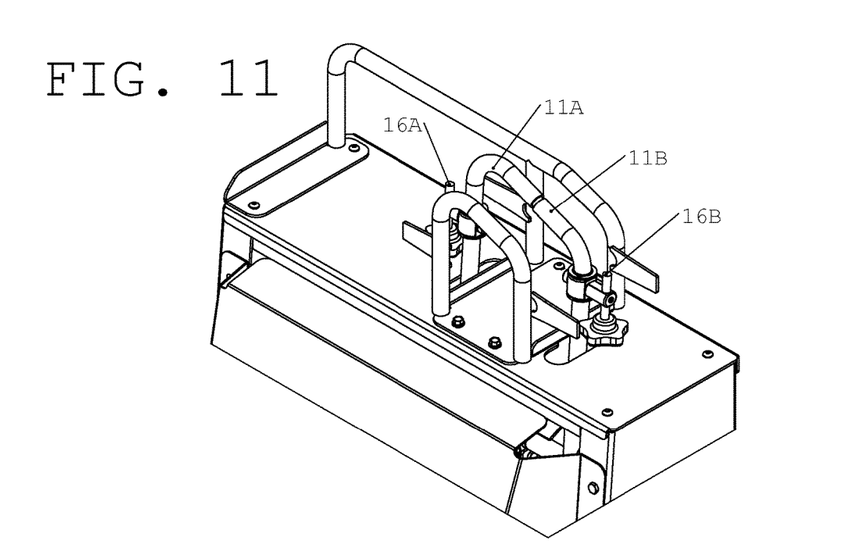
FIGS. 11 and 12 are perspective views of still another exemplary control portion for a tracked vehicle.
Figure 12:
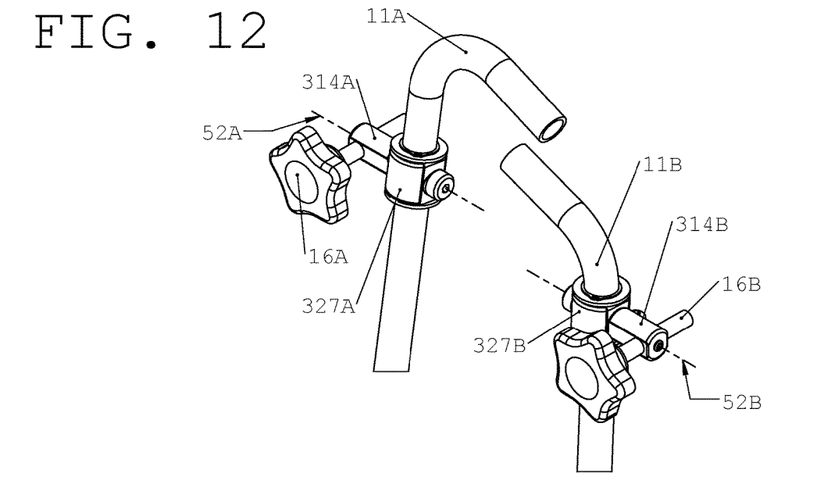

FIGS. 11 & 12 show another alternative embodiment wherein the control levers 11A and 11B each have a trunnion mount 327A, 327B fixed to the control lever. Each trunnion 314A, 314B is pivotally attached to a respective one of the trunnion mounts 327A, 327B such that each trunnion pivots about a generally horizontal axis 52A, 52B that is substantially perpendicular to the control lever. The knobs 16A, 16B are threaded through the trunnions 314A, 314B with their threaded screw portions perpendicular to the axes 52A, 52B. When a knob is turned about the axis of its threaded screw portion, the knob moves in and out through the trunnion.

Each trunnion 314A, 314B can then be individually pivoted such that the knobs 16A, 16B can move between at least two or three primary desirable positions. A first primary desirable position, shown in FIG. 11, will prevent the knobs 16A, 16B from interfering with the movement of the control levers such that the control levers can reach the full extent of both their fore and aft positions. At a second primary desirable position, not shown, the threaded screw ends of the knobs project rearward from the control levers, preventing full rearward movement of the control levers. At a third primary desirable position, shown in FIG. 12, the threaded screw ends of the knobs project forward from the control levers, preventing full forward movement of the control levers. In an optional fourth primary position, the threaded screw ends of the knobs can project downwardly, 180° from the first position shown in FIG. 11, which can also prevent the knobs from interfering with the movement of the control levers such that the control levers can reach the full extent of both their fore and aft positions.

The embodiment of FIGS. 11 and 12 allows each knob to be individually engaged or not engaged with either a forward limiter or a rearward limiter. Bumper plates can optionally be included on the hand rest 13 and the bar 10 (as illustrated), or on the threaded screws.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Integers, characteristics, materials, and other features described in conjunction with a particular aspect, embodiment, or example of the disclosed technology are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods.

As used herein, the terms "a", "an", and "at least one" encompass one or more of the specified element. That is, if two of a particular element are present, one of these elements is also present and thus "an" element is present. The terms "a plurality of" and "plural" mean two or more of the specified element. As used herein, the term "and/or" used between the last two of a list of elements means any one or more of the listed elements. For example, the phrase "A, B, and/or C" means "A", "B,", "C", "A and B", "A and C", "B and C", or "A, B, and C." As used herein, the term "coupled" generally means physically coupled or linked and does not exclude the presence of intermediate elements between the coupled items absent specific contrary language.

In view of the many possible embodiments to which the principles of the disclosed technology may be applied, it should be recognized that the illustrated embodiments are only examples and should not be taken as limiting the scope of the disclosure. Rather, the scope of the disclosure is at least as broad as the following claims. We therefore claim all that comes within the scope of the following claims.

The invention claimed is:

1. A control system for a vehicle having independently controlled left and right drive mechanisms, the system comprising:
   a first lever that controls the speed of the left drive mechanism of the vehicle, the first lever having a full range of motion that includes at least a neutral position and a full maximum position;
   a second lever that controls the speed of the right drive mechanism of the vehicle, the second lever having a full range of motion that includes at least a neutral position and a full maximum position;
   an adjustable first limiter adapted to adjustably limit the first lever to a selected reduced range of motion that includes its neutral position and is constrained at one end by a modified maximum position that is between its neutral position and its full maximum position, the first limiter being adjustable to adjust the modified maximum position of the first lever by axial motion of the first limiter along a first adjustment axis that is aligned with the full range of motion of the first lever;
   an adjustable second limiter adapted to adjustably limit the second lever to a selected reduced range of motion that includes its neutral position and is constrained at one end by a modified maximum position that is between its neutral position and its full maximum position, the second limiter being adjustable to adjust the modified maximum position of the second lever by axial motion of the second limiter along a second adjustment axis that is aligned with the full range of motion of the second lever;
   wherein the first limiter is additionally movable away from the first adjustment axis between an engaged position and a disengaged position, wherein in the engaged position the first limiter obstructs the first lever and limits the first lever to the selected reduced range of motion and in the disengaged position the first lever is allowed its full range of motion; and
   wherein the second limiter is additionally movable away from the first adjustment axis between an engaged position and a disengaged position, wherein in the engaged position the second limiter obstructs the second lever and limits the second lever to the selected reduced range of motion and in the disengaged position the second lever is allowed its full range of motion.

2. The system of claim 1, wherein the first and second limiters are movable between their engaged positions and their disengaged positions by pivoting.

3. The system of claim 2, wherein the first and second limiters are movable between their engaged positions and their disengaged positions by pivoting about at least one pivot axis that is transverse to the first and second adjustment axes.

4. The system of claim 2, wherein the first and second limiters are movable between their engaged positions and their disengaged positions by pivoting about a common pivot axis.

5. The system of claim 4, wherein the first and second limiters are mounted to a common trunnion that is pivotable about the common pivot axis.

6. The system of claim 2, wherein the first and second limiters are movable between their engaged positions and their disengaged positions by pivoting about two different respective pivot axes.

7. The system of claim 6, wherein the first and second limiters are mounted to first and second respective trunnions, and the first and second trunnions are pivotable about the first and second pivot axes, respectively.

8. The system of claim 6, wherein the first and second limiters are mounted on the first and second levers.

9. The system of claim 8, wherein the two different pivot axes are defined by longitudinal axes of the first and second levers, respectively.

10. The system of claim 8, wherein the two different pivot axes are perpendicular to longitudinal axes of the first and second levers, respectively.

11. The system of claim 1, wherein the first and second limiters are not mounted to the first and second levers.

12. The system of claim 1, wherein the first and second limiters are moveable along the first and second adjustment axes by rotation of the first and second limiters about the first and second adjustment axes.

13. The system of claim 1, wherein the first and second limiters are independently adjustable to two different respective axial positions along the first and second adjustment axes such that the left and right drive mechanisms are limitable to two different maximum speeds corresponding to the two different axial positions of the limiters.

14. The system of claim 1, wherein the first and second levers comprise respective first and second grip portions that are adjacent to each other, and wherein the first and second grip portions are aligned with each other along a common non-horizontal grip axis.

15. A vehicle comprising independently controlled left and right drive mechanisms and the control system of claim 1.

16. A method of using the control system of claim 1, the method comprising:
   moving the first and second limiters to their respective engaged positions;
   adjusting the first and second limiters along the first and second adjustment axes, respectively, to define selected reduced ranges of motion for the first and second levers; and
   actuating the first and second levers to their respective modified maximum positions to cause the drive mechanisms to drive at speeds that are less that their maximum speeds.

17. The method of claim 16, further comprising adjusting one or both of the first and second limiters along the first and second adjustment axes while the first and second levers are at their respective modified maximum positions to modify the speed of one or both of the left and right drive mechanisms.

18. The method of claim 16, further comprising moving one or both of the first and second limiters from their engaged positions to their disengaged positions while the vehicle is driving to allow one or both of the first and second levers to be actuated beyond their modified maximum positions toward their full maximum positions.

19. The method of claim 16, wherein adjusting the first and second limiters along the first and second adjustment axes comprises adjusting the first and second limiters to two unequal positions along the first and second adjustment axes so that the left and right drive mechanisms have different speeds when the first and second levers are at their respective modified maximum positions.

20. The method of claim 16, further comprising maintaining the first and second levers in their respective modified maximum positions over a course of travel by clamping the first and second levers toward a stationary hand rest of the control system and thereby maintaining constant contact between the first and second levers and the first and second limiters.

* * * * *